United States Patent [19]

Yoshikawa

[11] 4,268,385
[45] May 19, 1981

[54] CENTRIFUGAL ROTATING DISC ASSEMBLY FOR BIOLOGICAL WASTE WATER TREATMENT APPARATUS

[75] Inventor: Norihiro Yoshikawa, Yokohama, Japan

[73] Assignee: Dengyosha Engineering Co., Inc., Tokyo, Japan

[21] Appl. No.: 16,555

[22] Filed: Mar. 1, 1979

[30] Foreign Application Priority Data

Mar. 14, 1978 [JP] Japan .................................. 53-28867

[51] Int. Cl.³ ...................... B01D 21/26; B01D 33/26; C02F 3/10
[52] U.S. Cl. ............................... 210/150; 210/360.1; 210/512.1; 261/92
[58] Field of Search ................... 210/17, 78, 512, 150, 210/151, 220, 360 R; 261/92

[56] References Cited

U.S. PATENT DOCUMENTS

| | | | |
|---|---|---|---|
| 3,335,081 | 8/1967 | El-Naggar | 210/17 |
| 3,389,798 | 6/1968 | Hartmann et al. | 210/17 |
| 3,613,890 | 10/1971 | Hellqvist | 210/150 |
| 3,827,559 | 8/1974 | Gass et al. | 210/150 |
| 3,886,074 | 5/1975 | Prosser | 261/92 |
| 4,157,303 | 6/1979 | Yoshikawa | 210/150 |
| 4,160,736 | 7/1979 | Prosser | 210/150 |

*Primary Examiner*—Robert H. Spitzer
*Assistant Examiner*—E. Rollins Cross

*Attorney, Agent, or Firm*—Silverman, Cass & Singer, Ltd.

[57] ABSTRACT

A centrifugal rotating disc assembly for a biological waste water treatment apparatus includes a plurality of dual discs rotatively driven while their lower halves are immersed in waste water to be biologically treated.

According to the invention the disc assembly comprises suction openings in plates of the dual discs, suction chambers in the proximity thereof, a number of radially outwardly extending pleats formed in the plates to form a number of radial polygonal tubular channels and communicating passageways circumferentially across the radial polygonal tubular channels, thereby improving the permeability of the waste water through the assembly and facilitating the discharge of the waste water to achieve a remarkably high purification efficiency. According to the invention, a waste water treatment apparatus includes the centrifugal rotating disc assemblies, one of which being formed in the circumferential portions of the dual discs with turbine blades to form arcuate passageways communicating with the inside of the rotating dual discs, and at least one flow adjustable water jet nozzle supplying a water jet and at least one flow adjustable air jet nozzle supplying an air jet in opposition to the turbine blades exposed to the air above the waste water, the water jet and air jet being directed into and striking the turbine blades to rotate the disc assemblies thereby improving the exposure of the waste water to air to achieve the higher purification efficiency and saving the energy for operating the apparatus.

8 Claims, 22 Drawing Figures

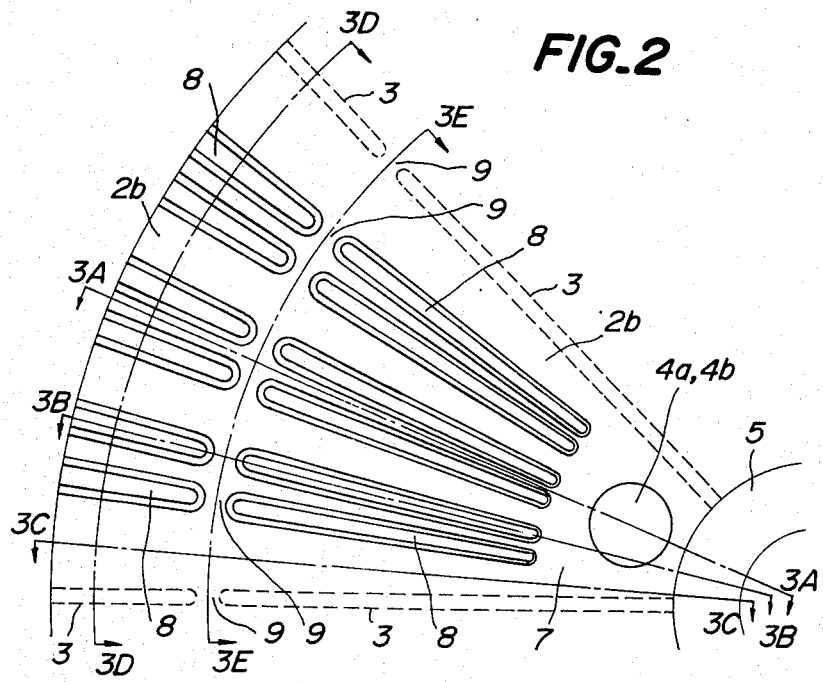
FIG. 2
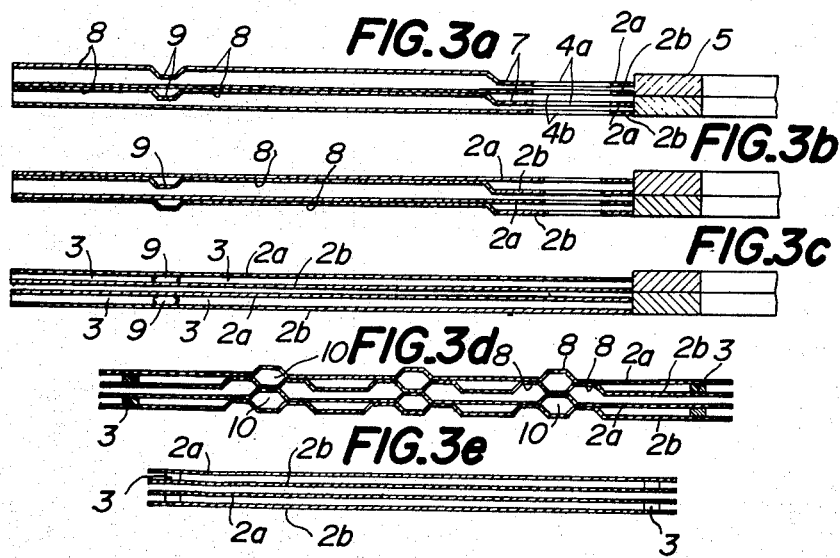
FIG. 3a
FIG. 3b
FIG. 3c
FIG. 3d
FIG. 3e

FIG.7
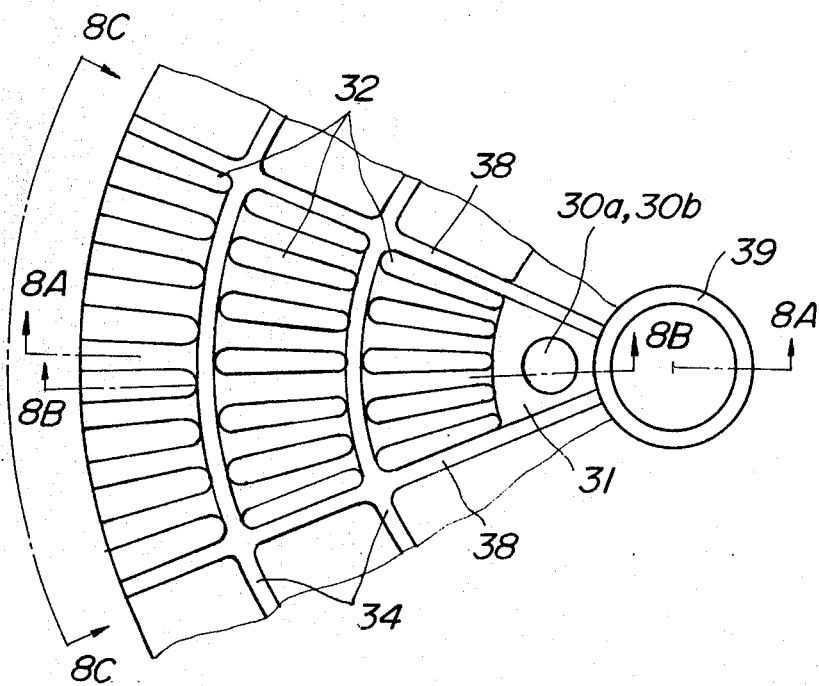
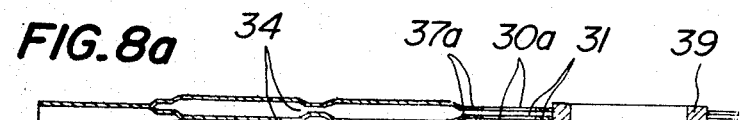
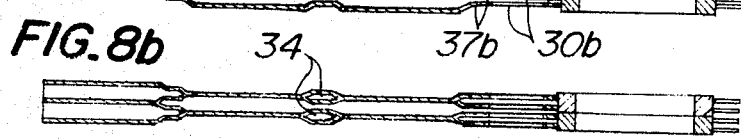
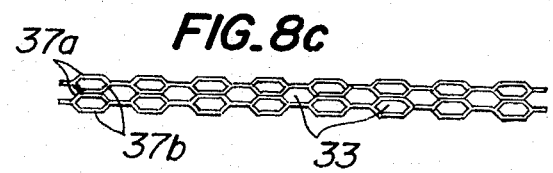

CENTRIFUGAL ROTATING DISC ASSEMBLY FOR BIOLOGICAL WASTE WATER TREATMENT APPARATUS

BACKGROUND OF THE INVENTION

1. Field of the Invention

The present invention relates to a centrifugal rotating disc assembly for a biological waste water treatment apparatus including one or more rotating discs arranged in tandem or in parallel and rotatively driven while their lower halves are immersed in waste water for its purification with a high efficiency.

2. Description of the Prior Art

The rotating disc-type waste water treatment apparatuses for purifying waste water have been known, whose principle is based on the fact that the bacteria, microorganisms and algae propagated on the surfaces of rotating discs whose lower halves are immersed in the waste water take up and digest the nitrogen or phosphorus in waste water as nutrient. Various waste water treatment apparatuses of the aforenoted rotating type have been proposed. It is generally required for the treatment apparatus to provide great areas for attaching the microorganisms to improve its purification without increasing outer diameters of the discs and axial lengths. It is also required for the apparatus to be light weight, compact and durable for many years and to be driven by as little driving power as possible.

In some instances of the prior art, circular discs formed with recesses and protrusions on both their surfaces have been proposed for the purpose of increasing the surface areas to improve purification. However, there has been a tendency of such rotating discs to require increased driving power. In order to make the rotating discs light, attempts have been made to produce the discs of foamed polystyrene, waterproof plywood and the like. However, the discs made of these materials may be inferior in durability.

It has been suggested to provide a centrifugal rotating disc-type biological oxidation treatment apparatus including two parallel thin discs having at its center a suction opening and impeller blades therebetween to form a rotating dual disc in the form of a centrifugal impeller. Such a plurality of the dual discs are fitted on a main shaft to form a multiple stage dual disc assembly. This rotating disc assembly is compact and light weight and has surface areas for attaching the generated microorganisms which are wide in spite of its short axial dimension. The rotating disc assembly is made in the form of centrifugal impellers which facilitate with the aid of the centrifugal force the attaching and aerating of the microorganisms and natural discharge of accumulated microorganisms from the surfaces of the rotating disc assembly. In addition, the rotating disc assembly is driven with less driving power because of its low hydraulic frictional resistance resulting from its relatively simple configuration. In order to achieve a higher purification efficiency, however, it is desired for such a rotating disc assembly to increase the surface areas of the discs.

It has been suggested in the United States to provide rotating discs of double walls having a number of concentric corrugations for the purpose of increasing the surface areas. However, these rotating discs are apt to become anaerobic because of their low permeability and have a disadvantage in that removed microorganisms tend to clog on the corrugations of the discs.

It has been suggested to drive such rotating discs by pneumatic power while utilizing it for the exposure of the waste water to air, thereby improving the purification efficiency. However, the suggested pneumatical drive devices are generally of low efficiency in driving apparatus. A pneumatically driven rotating disc-type waste water treatment apparatus has been proposed, for example, by U.S. Pat. No. 3,886,074 wherein rotating discs are formed at their outer cirumferences with a number of closed inner ended pockets opening opposite to the rotating direction and are rotatively driven by the buoyancy of bubbling air trapped in the pockets which has been jetted through a number of nozzles into the waste water and rising therethrough, while the air jetted from the nozzles is utilized for the exposure of the waste water to air. In this driving system, only buoyancy of the air in the waste water serves as a driving power for the treatment apparatus.

SUMMARY OF THE INVENTION

A primary object of the invention is, therefore, to provide a centrifugal rotating disc assembly for a biological waste water treatment apparatus, which eliminates all the above disadvantages in the prior art and includes broad surface areas for attaching microorganisms in spite of its short axial dimension to achieve the high performance of purification without increasing the driving power.

Another object of the invention is to provide a rotating disc assembly for a waste water treatment apparatus which keeps a high permeability to prevent the apparatus from becoming anaerobic and has a configuration of discs to eliminate the clogging of microorganisms on the surfaces thereof.

A further object of the invention is to provide a rotating disc assembly for a waste water treatment apparatus which is compact and light weight and durable in use.

Still a further object of the invention is to provide a rotating disc assembly for a waste water treatment apparatus which is hydraulically and pneumatically driven at a high efficiency and capable of utilizing the air for driving the apparatus for the exposure of the waste water to air.

Another object of the invention is to provide a waste water treatment apparatus comprising turbine blades in one rotating disc assembly to form arcuate passageways communicating with the inside of the rotating disc assembly, and at least one flow adjustable water jet nozzle and at least one flow adjustable air jet nozzle, thereby achieving the higher purification efficiency and saving the energy for the operation of the apparatus.

The centrifugal rotating disc assembly for a biological waster water treatment apparatus including a plurality of rotating dual discs vertically fixed to a main shaft, each said rotating dual disc consisting of a main plate, a side plate parallel thereto and a plurality of radial blades arranged therebetween to form a centrifugal impeller having at its center a suction opening, according to the present invention comprises respective suction openings in opposition to each other formed in said main and side plates of each sectorbox-shaped structure surrounded by said main and side plates of said dual discs to form a suction chamber, a number of radial pleats formed in said main and side plates extending outwardly from each said suction chamber to form a number of polygonal tubular channels when said main and side plates are assembled, thereby increasing surface areas for attaching microorganisms, and at least one communicating passageway formed in each said main and side plates and circumferentially traversing said tubular channels and blades, thereby improving permeabilities and discharge of waste water to obtain a higher efficiency of aerobic treatment.

In another aspect of the invention the waste water treatment apparatus, each rotating disc assembly comprises a plurality of rotating dual discs vertically fixed to a main shaft, each said rotating dual disc consisting of a main plate, a side plate parallel thereto and a plurality of radial blades arranged therebetween to form a centrifugal impeller having at its center a suction opening, the improvement comprising respective suction openings in opposition to each other formed in said main and side plates of each sectorbox-shaped structure surrounded by said main and side plates of said dual discs to form a suction chamber, a number of radial pleats formed in said main and side plates extending outwardly from each said suction chamber to form a number of polygonal tubular channels when said main and side plates are assembled, thereby increasing surface areas for attaching microorganisms, and at least one communicating passageway formed in each said main and side plates and circumferentially traversing said tubular channels and blades, one of said centrifugal rotating disc assembly being formed in the outer circumferential portions of said main and side plates with turbine blades in stead of said tubular channels to form arcuate passageways communicating with the inside of the rotating dual discs, and at least one flow adjustable water jet nozzle and at least one flow adjustable air jet nozzle in opposition to said turbine blades exposed to the air above the waste water.

In order that the invention may be more clearly understood, preferred embodiments will now be described, by way of example, with reference to the accompanying drawings.

BRIEF DESCRIPTION OF THE DRAWINGS

FIG. 1b is a sectional elevation of the disc assembly shown in FIG. 1a;

FIG. 2 is a partial front view of a rotating disc assembly according to the invention;

FIGS. 3a-3e are sectional views of the assembly taken along the lines 3A—3A, 3B—3B, 3C—3C, 3D—3D and 3E—3E in FIG. 2;

FIG. 6b is a side elevation of the apparatus shown in FIG. 6a;

FIG. 7 is a partial front view of a preferred embodiment of the rotating disc assembly;

FIGS. 8a-8c are sectional views of the assembly taken along the lines 8A—8A, 8B—8B and 8C—8C in FIG. 7;

FIG. 9b is a sectional view showing the communicating passages in hexagonal crosssection of the turbine blades of the apparatus taken along the lines 9B—9B in FIG. 9a.

DETAILED DESCRIPTION OF THE PREFERRED EMBODIMENT

Figure 1A:
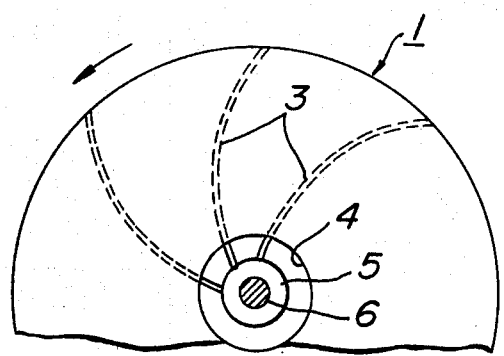
FIG. 1a is a schematic elevation of a rotating disc assembly of a typical centrifugal rotating disc-type waste water treatment apparatus of the prior art.
Figure 1B:
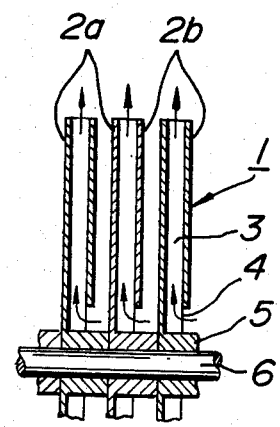

Referring to FIGS. 1a and 1b, a typical centrifugal rotating disc-type biological oxidation treatment apparatus in the prior art comprises two parallel thin discs or a main disc 2a having at its center a boss 5 and a side disc 2b having at its center a suction opening 4 and arcuate or radial impeller blades 3 therebetween. These discs and blades are integrally joined to form a rotating dual disc 1 in the form of a centrifugal impeller. A plurality of the rotating dual discs 1 are fitted on a main shaft 6 with their bosses 5 to form a multiple stage dual disc assembly.

The disc assembly may be made of a plastic material having a high rigidity but a less specific weight, so that with a relatively large rotating assembly having a diameter in the order of 2-5 m, the thickness of the main and side discs can be in the order of 1-3 mm and the width of outlet of one dual disc and the distance between the discs can be in the order of 15-30 mm. As the result, the rotating assembly becomes compact as a whole and the weight becomes as light as possible. With this arrangement, surface areas of the rotating disc assembly for attaching the generated microorganisms become wide in spite of its short axial dimension and are approximately twice as wide as the areas of the flat plate type rotating discs. As the rotating disc assembly is made in the form of centrifugal impellers, the waste water and air are alternately caused to pass through the inside of the impellers with the aid of the centrifugal force to facilitate the attaching and aerating of the microorganisms and smoothly effect the natural removal or discharge of accumulated microorganisms from the surfaces of the rotating disc assembly resulting in the high performance of purification. On the other hand, such rotating discs are not subjected to a large hydraulic frictional resistance which would occur in discs complicated in configuration, so that the rotating disc assembly is driven with a lesser driving power. With such a rotating disc assembly in the form of centrifugal impellers facilitating the air to pass therethrough which is suitable for an aerobic treatment, however, it is necessary to increase the surface areas of the discs by improving the configuration thereof in order to achieve a higher purification efficiency.

According to the invention as illustrated in FIGS. 2 and 3, main plates 2a, side plates 2b forming dual discs with the main plates 2a, blades 3 and hubs 5 form a number of sectorbox-shaped structures. The main and side plates 2a and 2b are formed near the hubs 5 with respective one circular suction openings 4a and 4b in opposition to each other to form suction chambers 7 in the proximity thereof which serve to cause the air and waste water flowing through the suction openings 4a and 4b to flow uniformly in the sectorbox-shaped structures surrounded by the dual discs 2a and 2b and blades 3.

Each sectorbox-shaped structure surrounded by the plates 2a and 2b and the blades 3 is formed with a number of pleats 8 as shown in FIGS. 2 and 3a-3c to form a number of radial polygonal cylinders or tubular channels 10 when the plates 2a and 2b are assembled as shown in FIG. 3d. With this arrangement, the surface areas of the discs adapted to contact or be exposed to the waste water and air are greatly increased over conventional discs. Communicating passageways 9 are provided in the plates 2a and 2b circumferentially across all the channels 10 and blades 3 to facilitate the flowing of the waste water and air all over the rotating discs. When the parts of the rotating discs move from the waste water into the air during the rotating movement, the waste water included in the disc assembly falls through the passageways 9 so that the waste water is discharged as completely as possible to reduce the required driving power which would otherwise increase due to the weight of the waste water retained in the rotating disc assembly. The number of pleats 8 serve also as distance pieces or spacers between the disc plates.

Figure 4:
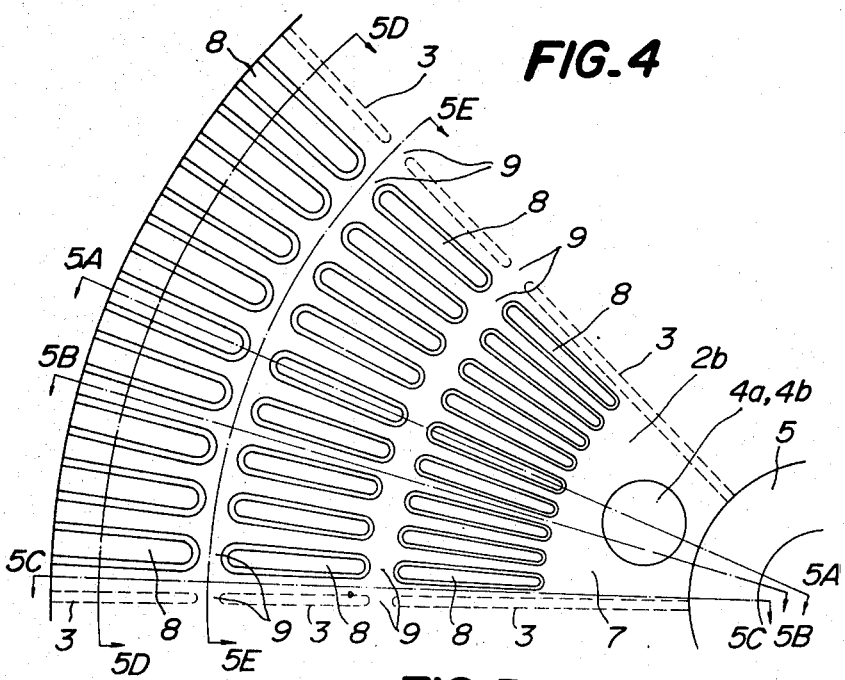
FIG. 4 is a partial front view of other embodiment of the rotating disc assembly according to the invention.
Figure 5A:
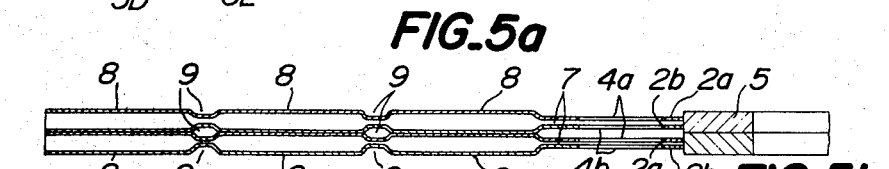
FIGS. 5a-5e are sectional views of the assembly taken along the lines 5A—5A, 5B—5B, 5C—5C, 5D—5D and 5E—5E in FIG. 4.
Figure 5B:
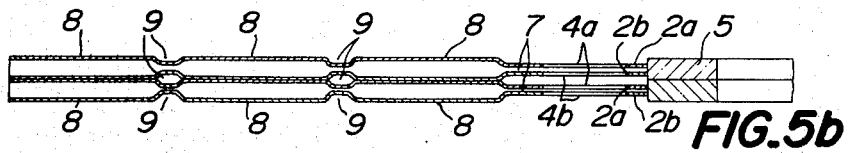
Figure 5C:
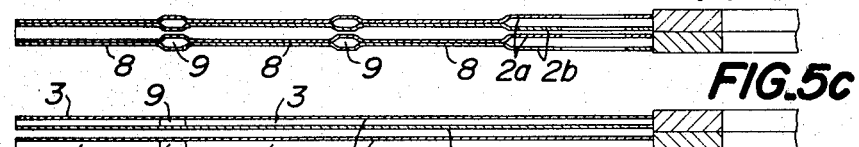
Figure 5D:
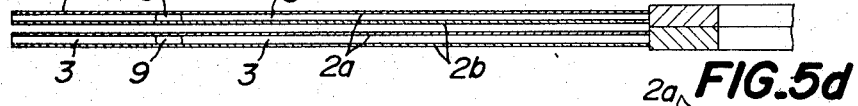
Figure 5E:
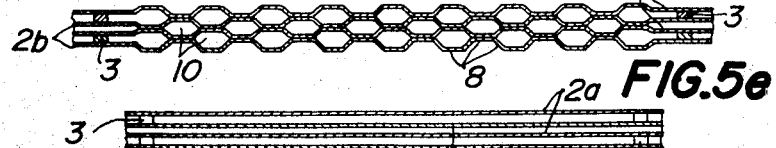

FIGS. 4 and 5 illustrate another embodiment of the invention. In this embodiment, main plates 2a and side plates 2b of rotating dual discs in the form of a centrifugal impellers are formed on their sector portions with many more pleats 8 which are modified in configuration to form radial cylinders or tubular channels extending outwardly from suction chambers such that all the radial channels or passages are in hexagonal cross section when the main and side plates are assembled and all the channels between the dual discs are also in hexagonal cross section thereby greatly increasing the surface areas adapted to be in contact with the waste water and air to greatly improve the purification effeciency.

The principle of the present invention can be applied to centrifugal impeller rotating discs made of a plurality of divided sectors with a higher purification efficiency.

The centrifugal rotating disc assembly according to the invention comprises the suction openings 4a and 4b, suction chambers 7 in the proximity thereof, a number of radial pleats 8 radially outwardly extending formed in the main and side plates which serve as distance pieces or spacers therefor, to form polygonal channels 10 thereby improving the permeability through the assembly. The invention further comprises communicating passageways 9 circumferentially across the radial channels 10 and blades 3 to better improve the permeability and facilitate the discharge of waste water and to accomplish a remarkably high purification efficiency resulting from the high permeability and the increased surface areas of the discs for attaching microorganisms.

Figure 6A:
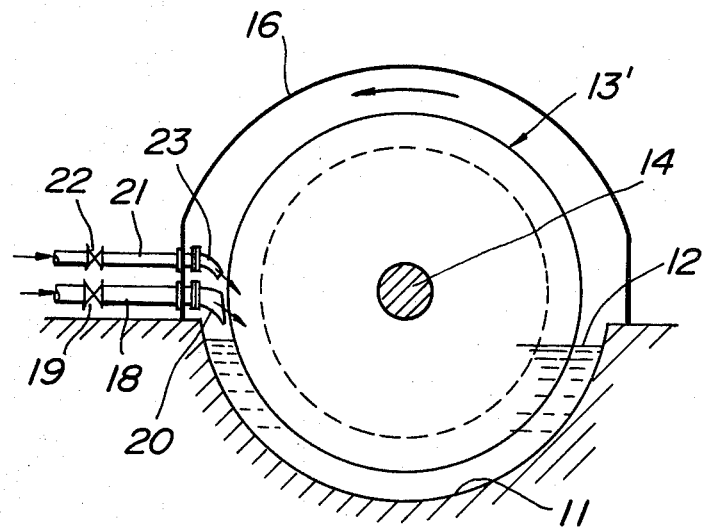
FIG. 6a is a front elevation partially in section, of a preferred embodiment of the waste water treatment apparatus according to the invention comprising driving means including turbine blades and air and water nozzles.
Figure 6B:
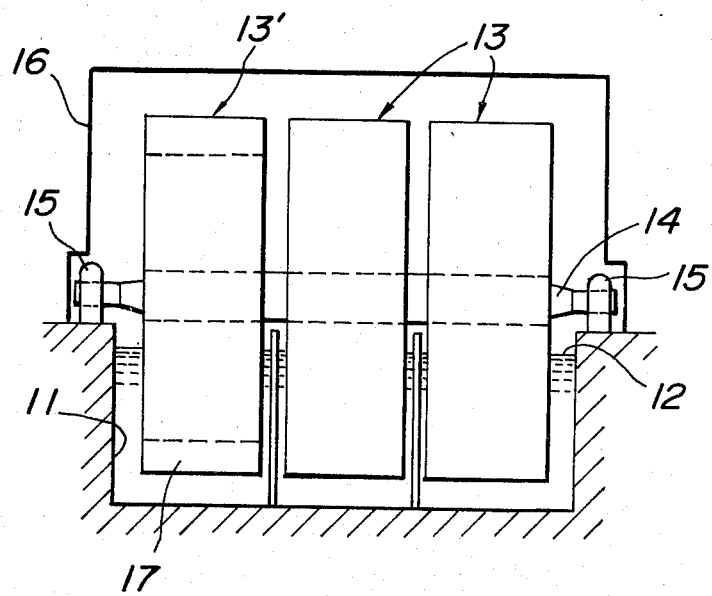

In order to better yet improve the purification efficiency, according to the invention the rotating disc assemblies are driven by a turbine type drive system employing air or other oxygen containing gas under pressure. FIGS. 6a and 6b diagrammatically illustrate a turbine type waste water treatment apparatus according to the invention wherein rotating disc assemblies 13 whose lower halves are immersed in waste water 12 in a tank 11 of the apparatus are mounted on a main shaft 14 journaled at its ends in bearings 15, all being covered by a cover 16. The rotating disc assembly 13' is provided on its outermost circumference with turbine blades 17 which may be provided only in the disc assembly arranged on the inlet side of the waste water.

Compressed air is supplied from a compressed air source (not shown) out of the apparatus through an air valve 19 and an air piping 18 into an air nozzle 20 in opposition to the turbine blades 17 exposed to the air over the waste water 12 in the tank 11 and having a width corresponding to that of the turbine blades 17. The air nozzle 20 may be divided into several nozzles. The compressed air is jetted against the turbine blades 17 to drive the disc assembly 13'. Furthermore, water is supplied from a pump (not shown) located out of the apparatus through a water valve 22 and a water piping 21 into a nozzle 23 or a plurality of nozzles in opposition to the turbine blades 17. The water is jetted against the turbine blades 17 to drive the disc assembly 13'. Accordingly, the whole rotating disc assemblies 13 are rotatively driven by the compressed air and water. Oxygen may be used in substitution for the compressed air.

Referring to FIGS. 7 and 8a-8c, according to the invention, main plates 37a and side plates 37b forming therebetween sectorbox-shaped structures are formed near hubs 39 with respective one circular suction openings 30a and 30b in opposition to each other to form suction chambers 31. The main plates 37a and side plates 37b are formed with a number of radial pleats 32 as shown in the drawings to form a number of radial polygonal cylinders or tubular channels 33 when the main and side plates are assembled as shown in FIG. 8c, thereby greatly increasing the surface areas of the discs adapted to contact or expose to the waste water and air.

Communicating passageway 34 are provided in the plates 37a and 37b circumferentially across mid portions of the tubular channels 33 and blades 38 to facilitate the flowing of the waste water and air into the rotating discs during their rotating movements. When the parts of the rotating discs move from the waste water into the air during their rotating movement, the waste water included in the disc assembly would fall through the passageways 34 so that the waste water is discharged as completely as possible to reduce the required driving power which would otherwise increase due to the weight of the waste water retained in the rotating disc assembly. With this arrangement, the main and side plates are formed with a great number of radial pleats 32 to form the tubular channels 33 all in the hexagonal crossection when the plates are assembled as shown in FIG. 8c, thereby greatly increasing the surface areas in contact with the waste water and air and improving the flowing of the waste water and air to make much greater the purification efficiency.

Figure 9A:
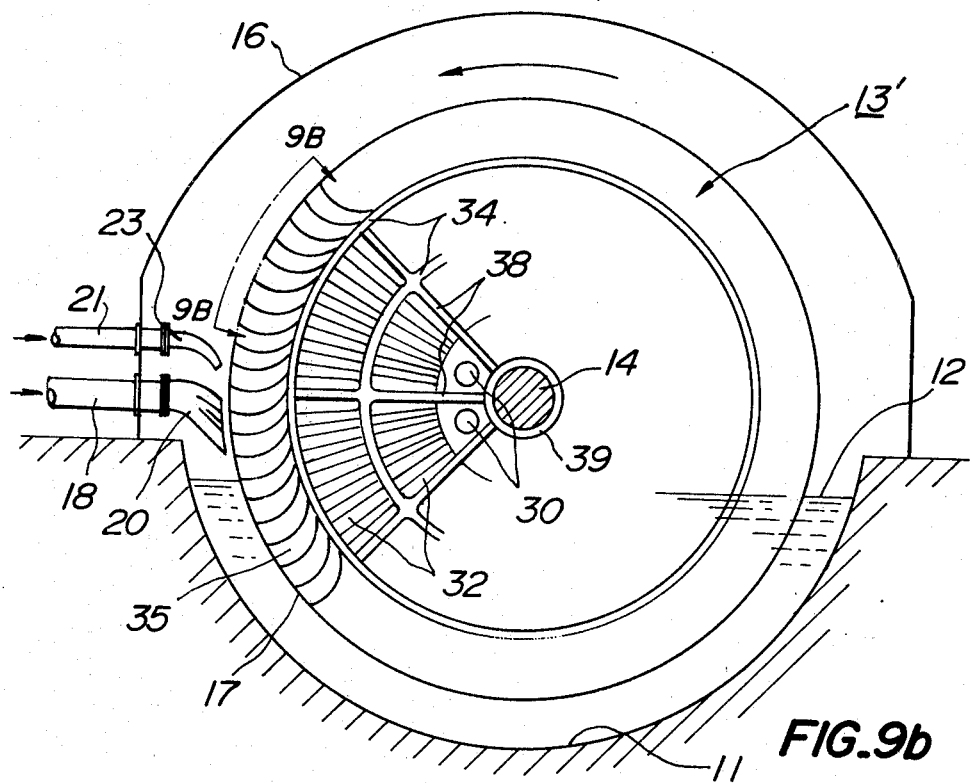
FIG. 9a is a partial front view of a preferred embodiment of the waste water treatment apparatus comprising turbine blades and air and water nozzles for driving the apparatus according to the invention.
Figure 9B:
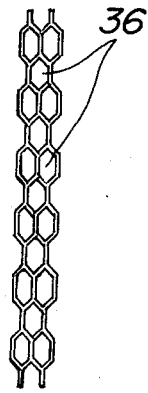

In order to drive this rotating disc assembly, as shown in FIG. 9a, the main plates 37a and side plates 37b are integrally formed at their outermost peripheral or circumferential portions with a number of arcuates pleats 35 instead of the radial pleats and in the other peripheral portions with the radial pleats 32 to form the turbine blades 17 having arcuate passageways in hexagonal cross-sections as viewed from the other periphery of the discs as shown in FIG. 9b when the main and side discs are assembled.

According to the embodiment of the invention, as described above, the rotating discs assemblies of dual discs including a great number of radial pleats are so modified that the main and side plates are integrally formed in their outermost circumferential portions with a number of arcuate pleats instead of the radial pleats to form the turbine blades having a number of arcuate passageways in hexagonal crossections when the main and side plates are assembled, thereby facilitating driving the rotating discs pneumatically and hydraulically. The compressed air or oxygen or water flowing into the inlets of the turbine blades turns its flowing direction therein and further flows through the outlets of the blades into the tubular channels defined by the pleats formed in the inner portions of the rotating discs so that the turning energy of the driving medium can be effectively utilized during the turning motion in the turbine blades, thereby obtaining the higher driving efficiency. It is clearly evident that the driving means according to the invention is quite different from that utilizing the buoyancy of bubbling air in the waste water trapped in closed inner ended pockets mounted on the outer circumferences of the rotating discs of the prior art. According to the present invention the compressed air and water are simultaneously used to drive the rotating assemblies by jetting the compressed air and water directly against the turbine blades 17 through the air and water nozzles 20 and 23.

With this embodiment, as above described, the rotating disc assemblies are driven mainly by the water jet and supplementarily by the compressed air and it is sufficient to provide the turbine blades only on one rotating disc assembly 13' as shown in FIG. 6b. The rotating disc assembly 13' with turbine blades is preferably located in the highest concentration area of the waste water which is probably near the inlet of the tank for the waste water. The waste water may be used as the water under pressure. In this case, the waste water flowing into the tank 11 may be branched at a waste water pump (not shown) and fed to the water nozzle 23 through the water valve 22 and piping 21 to be jetted against the turbine blades 17 without requiring any other water and pump. On the other hand when the compressed air is fed through the air valves 19 and piping 18 and jetted through the air nozzle 20 against the turbine blades 17, the jetted air enters thereinto to drive the rotating disc assembly 13' with turbine blades and the rotating disc assemblies 13 concentric thereto in conjunction with the hydraulical power of the water. The air flowing out of the turbine blades 17 further flows through the radial pleats 32 and the circumferential passageways 34 into the tank 11, while the part of the compressed air jetted through the air nozzle 20 flows or passes by the outer periphery of the rotating disc assembly 13' with the turbine blades and directly flows into the waste water in the tank 11 to improve the exposure of the waste water to air which is of relatively higher concentration in and out of the rotating disc assembly with the turbine blades, thereby obtaining a much higher purification efficiency which would otherwise never be obtained.

According to the invention the air valve 19 and water valve 22 are properly adjusted to change the proportion of the compressed air and water, thereby accomplishing the most suitable air amount for exposure and revolution per minutes of the assemblies corresponding to the property and concentration of the waste water to be treated, and the power for driving the blower and pump is suitably adjusted to achieve the higher purification efficiency as a whole and saving the energy for the operation of the apparatus. The exposure effect of the air for driving the turbine-type disc assembly is advantageous in treating a high concentration waste water. Moreover, the apparatus incorporating therein the rotating disc assemblies according to the invention can effectively treat a high concentration waste water, which would never be treated by the prior treatment apparatus, by utilizing the part of the treated water in place of the waste water for driving the disc assemblies to obtain a much better treatment result.

It is understood by those skilled in the art that the foregoing description is of the preferred embodiments of the invention and that various changes and modifications may be made in the invention without departing from the spirit and scope thereof.

What is claimed is:

1. In a centrifugal rotating disc assembly for a biological waste water treatment, apparatus including a plurality of rotating dual discs vertically fixed to a main shaft, each said rotating dual disc consisting of a main plate, a side plate parallel thereto and a plurality of radial blades arranged therebetween to form a centrifugal impeller having at its center a suction opening, the improvement comprising respective suction openings in opposition to each other formed in said main and side plate of each sectorbox-shaped structure surrounded by said main and side plates of said dual discs to form a suction chamber into which air and waste water enter through the suction openings, a number of radial pleats formed in said main and side plates extending radially outwardly from each said suction chamber to form a number of polygonal tubular channels open to the circumference of the disc when said main and side plates are assembled to allow air and waste water to flow from the suction chambers and to exit at the circumference of the disc, said pleats serving as spacers between adjacent plates, thereby increasing surface areas for attaching microorganisms, jet impinging on said impeller for rotating said disc assembly, and at least one communicating passageway formed in each said main and side plates and circumferentially traversing said tubular channels and blades, thereby improving permeabilities and discharge of waste water from said channels as the discs rotate to obtain a higher efficiency of aerobic treatment and reduce the driving force for the assembly.

2. A centrifugal rotating disc assembly as set forth in claim 1, wherein said pleats are so formed in each said plates that said polygonal tubular channels between said main and side plates and between said dual discs are all hexagonal in section.

3. A centrifugal rotating disc assembly as set forth in claim 1, wherein said at least one concentric communicating passageway is formed in each plate.

4. A centrifugal rotating disc assembly as set forth in claim 1, wherein said rotating dual discs are made of a plurality of divided sectors.

5. A centrifugal rotating disc assembly as set forth in claim 1, wherein the outer circumferential portions of said main and side plates are formed with turbine blades to form arcuate passageways communicating with the inside of the rotating dual discs, and said jet means includes at least one flow adjustable water jet nozzle supplying a water jet and at least one flow adjustable air jet nozzle supplying an air jet in opposition to said turbine blades exposed to the air above the waste water, the water jet and air jet being directed into and striking the turbine blades to rotate the disc assembly around the main shaft.

6. A centrifugal rotating disc assembly as set forth in claim 5, wherein said turbine blades are formed by a number of arcuate pleats integrally formed in said main and side plates to form arcuate passageways all in hexagonal cross section when said plates are assembled.

7. A waste water treatment apparatus as set forth in claim 5, wherein said turbine blades are formed by a number of arcuate pleats integrally formed in said main and side plates to form arcuate passageways all in hexagonal cross-section when said plates are assembled.

8. A waste water treatment apparatus as set forth in claim 5, wherein said rotating disc assembly with said turbine blades is located in the highest concentration area of the waste water.

* * * * *